United States Patent
You et al.

(10) Patent No.: US 10,945,292 B2
(45) Date of Patent: Mar. 9, 2021

(54) RANDOM ACCESS METHOD AND DEVICE

(71) Applicant: HUAWEI TECHNOLOGIES CO., LTD., Guangdong (CN)

(72) Inventors: Xiaohu You, Nanjing (CN); Mao Wang, Nanjing (CN); Yalin Liu, Shanghai (CN); Jun Zhang, Shenzhen (CN); Min Hua, Nanjing (CN); Junping Sun, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/446,391

(22) Filed: Jun. 19, 2019

(65) Prior Publication Data

US 2019/0306894 A1  Oct. 3, 2019

Related U.S. Application Data

(63) Continuation of application No. PCT/CN2017/115975, filed on Dec. 13, 2017.

(30) Foreign Application Priority Data

Dec. 20, 2016 (CN) .......................... 201611187162.6

(51) Int. Cl.
*H04W 74/08* (2009.01)
*H04W 72/04* (2009.01)
(Continued)

(52) U.S. Cl.
CPC ....... *H04W 74/0833* (2013.01); *H04W 72/02* (2013.01); *H04W 72/04* (2013.01);
(Continued)

(58) Field of Classification Search
None
See application file for complete search history.

(56) References Cited

U.S. PATENT DOCUMENTS

2014/0198742 A1  7/2014 Baldemair et al.
2015/0016312 A1  1/2015 Li et al.
(Continued)

FOREIGN PATENT DOCUMENTS

| CN | 104619025 A | 5/2015 |
|---|---|---|
| CN | 105027651 A | 11/2015 |

(Continued)

OTHER PUBLICATIONS

3GPP TS 36.211 V13.0.0 (Dec. 2015),3rd Generation Partnership Project;Technical Specification Group Radio Access Network;Evolved Universal Terrestrial Radio Access (E-UTRA);Physical channels and modulation(Release 13),dated Dec. 2015,total 141 pages.
(Continued)

*Primary Examiner* — Anh Vu H Ly
(74) *Attorney, Agent, or Firm* — Womble Bond Dickinson (US) LLP

(57) ABSTRACT

A random access method and a device are provided, to enable a device in the Internet of Things to implement random access. The method includes: selecting, by a terminal from at least two frequencies, frequencies used to send a physical random access channel PRACH signal, as frequencies occupied by target PRACH resources, where the at least two frequencies each have a preset bandwidth, and there is no intersection between frequency bands of the at least two frequencies; generating, by the terminal, a target PRACH signal based on the frequencies occupied by the target PRACH resources, a root allocated by a base station, and a cyclic shift corresponding to the root allocated by the base station; and sending, by the terminal, the target PRACH signal to the base station on the target PRACH resources.

24 Claims, 6 Drawing Sheets

(51) Int. Cl.
*H04W 72/08* (2009.01)
*H04W 74/00* (2009.01)
*H04W 72/02* (2009.01)
*H04L 29/08* (2006.01)

(52) U.S. Cl.
CPC ....... *H04W 72/0453* (2013.01); *H04W 72/08* (2013.01); *H04W 72/085* (2013.01); *H04W 74/00* (2013.01); *H04W 74/08* (2013.01); *H04L 67/12* (2013.01)

(56) References Cited

U.S. PATENT DOCUMENTS

| | | |
|---|---|---|
| 2015/0359004 A1 | 12/2015 | Xu et al. |
| 2016/0286580 A1 | 9/2016 | Liu et al. |
| 2016/0323917 A1 | 11/2016 | Hwang et al. |
| 2017/0094689 A1* | 3/2017 | Lin .................. H04W 74/0833 |
| 2017/0265223 A1 | 9/2017 | Zhang et al. |
| 2018/0295648 A1* | 10/2018 | Chen .................. H04B 1/7143 |
| 2019/0254077 A1* | 8/2019 | Sahlin .................. H04L 5/0037 |

FOREIGN PATENT DOCUMENTS

| | | |
|---|---|---|
| CN | 105379336 A | 3/2016 |
| CN | 105472761 A | 4/2016 |
| CN | 105874726 A | 8/2016 |
| WO | 2014114167 A1 | 7/2014 |
| WO | 2015063590 A1 | 5/2015 |

OTHER PUBLICATIONS

3GPP TS 36.300 V12.4.0 (Dec. 2014),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 12),dated Dec. 2014,total 251 pages.

3GPP TS 36.213 V12.4.0 (Dec. 2014), 3rd Generation Partnership Project;Technical Specification Group Radio Access Network;Evolved Universal Terrestrial Radio Access (E-UTRA);Physical layer procedures(Release 12), 225 pages.

* cited by examiner

RANDOM ACCESS METHOD AND DEVICE

CROSS-REFERENCE TO RELATED APPLICATIONS

This application is a continuation of International Application No. PCT/CN2017/115975, filed on Dec. 13, 2017, which claims priority to Chinese Patent Application No. 201611187162.6, filed on Dec. 20, 2016. The disclosures of the aforementioned applications are hereby incorporated by reference in their entireties.

TECHNICAL FIELD

The present disclosure relates to the field of communications technologies, and in particular, to a random access method and a device.

BACKGROUND

A random access procedure is used to initialize access, obtain uplink synchronization, or request a resource. Random access is completed by active reporting by a device (namely, device triggering) or a paging function of a core network (namely, core network triggering). After the access succeeds, the device exchanges information with the core network, so as to ensure integrity of a communication service. The paging function of the core network means that the core network calls a specific device by using a paging signal, and a device that receives the paging signal performs random access, so that the core network can view local data of the device. Therefore, regardless of a communication manner of active reporting by the device or a communication manner based on the paging function, the device needs to perform a random access procedure on a basis of downlink synchronization, obtain uplink synchronization, and establish a bidirectional link with a base station, so as to perform bidirectional data transmission.

In the prior art, a PRACH signal of public network LTE cannot be directly applied to an Internet of Things system.

Specifically, a power system in the Internet of Things system provides a plurality of narrow band frequencies (25 kHz) for data receiving. However, the PRACH signal of public network LTE occupies a continuous bandwidth of 1.08 MHz, and therefore cannot be used in the power system.

SUMMARY

The present disclosure provides a random access method and a device, so that a device in an Internet of Things system implements random access.

The objective of the present disclosure is achieved by using the following technical solutions.

According to a first aspect, a random access method is provided, including:

selecting, by a terminal from at least two frequencies, frequencies used to send a physical random access channel (PRACH) signal, as frequencies occupied by target PRACH resources, where the at least two frequencies each have a preset bandwidth, and there is no intersection between frequency bands of the at least two frequencies; generating, by the terminal, a target PRACH signal based on the frequencies occupied by the target PRACH resources, a root allocated by a base station, and a cyclic shift corresponding to the root allocated by the base station; and sending, by the terminal, the target PRACH signal to the base station on the target PRACH resources.

Therefore, by using the method provided in this embodiment of the present disclosure, the terminal may select the frequencies occupied by the target PRACH resources, and generate the target PRACH signal based on the root allocated by the base station and a sequence corresponding to the root allocated by the base station, to match a feature of an Internet of Things system, and enable a device in the Internet of Things system to implement random access.

In one embodiment, the at least two frequencies are at least two frequencies used for data receiving in the Internet of Things system.

In one embodiment, the at least two frequencies are at least two frequencies used for data receiving in a power system of the Internet of Things system.

40 discrete frequencies authorized to an electric power sector are included in 223 MHz to 235 MHz (including 223 MHz and 235 MHz), and a bandwidth of each frequency is 25 KHz.

In one embodiment, there are at least two target PRACH resources, there are at least two frequencies used to send the PRACH signal, and the target PRACH resources are in a one-to-one correspondence with the frequencies used to send the PRACH signal.

In one embodiment, selecting, from at least two frequencies, frequencies used to send a PRACH signal includes:

randomly selecting, from the at least two frequencies, the frequencies used to send the PRACH signal, where this manner is easy to implement, but channel state information of a selected frequency is not considered in this manner; and if there is serious interference in the selected frequency, channel quality is not guaranteed, and therefore a random access success rate is affected; or selecting, from the at least two frequencies, frequencies corresponding to downlink system information that can be correctly parsed, as the frequencies used to send the PRACH signal, where the downlink system information is from the base station. It should be understood that the downlink system information is sent by the base station at the frequencies. Because channel quality at the frequencies corresponding to the downlink system information that can be correctly parsed is guaranteed, and interference is not serious, the random access success rate can be increased.

Therefore, this embodiment of the present disclosure provides different frequency selection methods.

In one embodiment, generating a target PRACH signal based on the frequencies occupied by the target PRACH resources, a root allocated by a base station, and a cyclic shift corresponding to the root allocated by the base station includes: obtaining reference signal received power RSRP of a signal from the base station; and when the RSRP is greater than a preset threshold, generating the target PRACH signal based on the frequencies occupied by the target PRACH resources, the root allocated by the base station, and a first cyclic shift corresponding to the root allocated by the base station, where the first cyclic shift is used to indicate that the RSRP is greater than the preset threshold; or when the RSRP is less than or equal to the preset threshold, generating the target PRACH signal based on the frequencies occupied by the target PRACH resources, the root allocated by the base station, and a second cyclic shift corresponding to the root allocated by the base station, where the second cyclic shift is used to indicate that the RSRP is less than or equal to the preset threshold.

It should be understood that when the RSRP is greater than the preset threshold, it indicates that the terminal is relatively close to a cell center, and when the RSRP is less than or equal to the preset threshold, it indicates that the terminal is relatively far from the cell center and may be located on a cell edge. Therefore, when generating the target PRACH signal by using different cyclic shifts, the terminal may further provide location information of the terminal for the base station, for example, indicating a relationship between a current location of the terminal and the cell center. In addition, the terminal may further provide service information of the terminal for the base station. For example, different cyclic shifts are corresponding to different services. The terminal determines, based on a service type of a service that needs to be initiated according to a requirement of the terminal, a corresponding cyclic shift to generate the target PRACH signal. When detecting the target PRACH signal, the base station may learn of, based on the cyclic shift corresponding to the target PRACH signal, the service type of the service that needs to be initiated by the terminal.

In one embodiment, a bandwidth occupied by a subcarrier in the target PRACH signal is greater than 100 Hz and less than 200 Hz. For example, the bandwidth of the subcarrier is 156.25 Hz.

In one embodiment, sending the target PRACH signal to the base station on the target PRACH resources includes: within a target sending time period corresponding to the target PRACH resources, sending the target PRACH signal to the base station at the frequencies occupied by the target PRACH resources, where the target sending time period is determined based on information about a cell in which the terminal is located, or the target sending time period is determined by the base station and notified to the terminal, and there is no intersection between sending time periods of respective PRACH signals corresponding to neighboring cells. Therefore, by using the method provided in this embodiment of the present disclosure, interference among terminals can be effectively avoided, and a random access success rate of a terminal is increased.

According to a second aspect, a random access method is provided, including: receiving, by a base station, a target physical random access channel PRACH signal sent by a terminal; when a cyclic shift corresponding to the target PRACH signal is a first cyclic shift, determining that a quantity of PDCCH resources allocated to the terminal is a first quantity, where the first cyclic shift is used to indicate that reference signal received power RSRP of a signal obtained by the terminal from the base station is greater than a preset threshold; or when the cyclic shift corresponding to the target PRACH signal is a second cyclic shift, determining that the quantity of PDCCH resources allocated to the terminal is a second quantity, where the second cyclic shift is used to indicate that the RSRP is less than or equal to the preset threshold, the second quantity is greater than the first quantity, and the first cyclic shift and the second cyclic shift are corresponding to a same root.

In one embodiment, receiving a PRACH signal sent by a terminal includes: receiving a to-be-detected signal; calculating a correlation coefficient between a sequence in the to-be-detected signal and a preamble sequence corresponding to the pre-stored first cyclic shift; calculating a correlation coefficient between the sequence in the to-be-detected signal and a preamble sequence corresponding to the pre-stored second cyclic shift, where when the correlation coefficient between the sequence in the to-be-detected signal and the preamble sequence corresponding to the first cyclic shift is greater than a valid threshold, the to-be-detected signal is a PRACH signal, and a cyclic shift corresponding to the to-be-detected signal is the first cyclic shift, and when the correlation coefficient between the sequence in the to-be-detected signal and the preamble sequence corresponding to the second cyclic shift is greater than the valid threshold, the to-be-detected signal is a PRACH signal, and the cyclic shift corresponding to the to-be-detected signal is the second cyclic shift; sending a random access response; and receiving uplink information from the terminal, where when the uplink information indicates that the to-be-detected signal is from the terminal, the to-be-detected signal is the target PRACH signal.

The correlation coefficient herein may be an inner product.

In one embodiment, the valid threshold is obtained based on a correlation coefficient between a preamble sequence corresponding to a pre-stored third cyclic shift and the sequence in the to-be-detected signal, and the first cyclic shift, the second cyclic shift, and the third cyclic shift are corresponding to the same root.

It should be understood that frequency interference is different at different moments. If the valid threshold is a fixed value, in a case of large interference, the base station may be likely to detect a PRACH signal by mistake. Therefore, the valid threshold needs to change in real time with an interference situation. In consideration that interference to different cyclic shift in sequences generated by one root is approximately the same, the valid threshold is determined by using the pre-stored third cyclic shift, so as to improve accuracy of determining that the received to-be-detected signal is the PRACH signal.

One PRACH resource may be corresponding to one root or may be corresponding to a plurality of roots.

Terminals in a same cell may use a same root, and sending time periods of the terminals in the same cell are the same.

In one embodiment, before the receiving a physical random access channel PRACH signal sent by a terminal, the method further includes: determining, based on information about a cell in which the terminal is located, a sending time period of a PRACH signal corresponding to the cell in which the terminal is located, where there is no intersection between sending time periods of respective PRACH signals corresponding to neighboring cells; and notifying the terminal of the sending time period of the PRACH signal corresponding to the cell in which the terminal is located, so that the sending time period serves as a target sending time period of the target PRACH signal.

Therefore, by using the method provided in this embodiment of the present disclosure, interference among terminals can be effectively avoided, and a random access success rate of a terminal is increased.

According to a third aspect, a terminal is provided, including a memory, a transceiver, and a processor, where the memory is configured to store program code to be executed by the processor; and the processor is configured to perform the following operations based on the program code stored in the memory: selecting, from at least two frequencies, frequencies used to send a physical random access channel PRACH signal, as frequencies occupied by target PRACH resources, where the at least two frequencies each have a preset bandwidth, and there is no intersection between frequency bands of the at least two frequencies; generating a target PRACH signal based on the frequencies occupied by the target PRACH resources, a root allocated by a base station, and a cyclic shift corresponding to the root allocated by the base station;

and sending the target PRACH signal to the base station on the target PRACH resources by using the transceiver.

In one embodiment, the at least two frequencies are at least two frequencies used for data receiving in an Internet of Things system.

In one embodiment, the at least two frequencies are at least two frequencies used for data receiving in a power system of the Internet of Things system.

In one embodiment, there are at least two target PRACH resources, there are at least two frequencies used to send the PRACH signal, and the target PRACH resources are in a one-to-one correspondence with the frequencies used to send the PRACH signal.

In one embodiment, when selecting, from the at least two frequencies, the frequencies used to send the PRACH signal, the processor is configured to:

randomly select, from the at least two frequencies, the frequencies used to send the PRACH signal; or select, from the at least two frequencies, frequencies corresponding to downlink system information that can be correctly parsed, as the frequencies used to send the PRACH signal, where the downlink system information is from the base station.

In one embodiment, when generating the target PRACH signal based on the frequencies occupied by the target PRACH resources, the root allocated by the base station, and the cyclic shift corresponding to the root allocated by the base station, the processor is configured to: obtain reference signal received power RSRP of a signal from the base station; and when the RSRP is greater than a preset threshold, generate the target PRACH signal based on the frequencies occupied by the target PRACH resources, the root allocated by the base station, and a first cyclic shift corresponding to the root allocated by the base station, where the first cyclic shift is used to indicate that the RSRP is greater than the preset threshold; or when the RSRP is less than or equal to the preset threshold, generate the target PRACH signal based on the frequencies occupied by the target PRACH resources, the root allocated by the base station, and a second cyclic shift corresponding to the root allocated by the base station, where the second cyclic shift is used to indicate that the RSRP is less than or equal to the preset threshold.

In one embodiment, a bandwidth occupied by a subcarrier in the target PRACH signal is greater than 100 Hz and less than 200 Hz.

In one embodiment, when sending the target PRACH signal to the base station on the target PRACH resources by using the transceiver, the processor is configured to: within a target sending time period corresponding to the target PRACH resources, send, by using the transceiver, the target PRACH signal to the base station at the frequencies occupied by the target PRACH resources, where the target sending time period is determined based on information about a cell in which the terminal is located, or the target sending time period is determined by the base station and notified to the terminal, and there is no intersection between sending time periods of respective PRACH signals corresponding to neighboring cells.

According to a fourth aspect, a base station is provided, including a memory, a transceiver, and a processor, where the memory is configured to store program code to be executed by the processor; and the processor is configured to perform the following operations based on the program code stored in the memory:

receiving, by using the transceiver, a target physical random access channel PRACH signal sent by a terminal; when a cyclic shift corresponding to the target PRACH signal is a first cyclic shift, determining that a quantity of PDCCH resources allocated to the terminal is a first quantity, where the first cyclic shift is used to indicate that reference signal received power RSRP of a signal obtained by the terminal from the base station is greater than a preset threshold; or when the cyclic shift corresponding to the target PRACH signal is a second cyclic shift, determining that the quantity of PDCCH resources allocated to the terminal is a second quantity, where the second cyclic shift is used to indicate that the RSRP is less than or equal to the preset threshold, the second quantity is greater than the first quantity, and the first cyclic shift and the second cyclic shift are corresponding to a same root.

In one embodiment, when receiving the PRACH signal sent by the terminal, the processor is configured to:

receive a to-be-detected signal by using the transceiver; calculate a correlation coefficient between a sequence in the to-be-detected signal and a preamble sequence corresponding to the pre-stored first cyclic shift; calculate a correlation coefficient between the sequence in the to-be-detected signal and a preamble sequence corresponding to the pre-stored second cyclic shift, where when the correlation coefficient between the sequence in the to-be-detected signal and the preamble sequence corresponding to the first cyclic shift is greater than a valid threshold, the to-be-detected signal is a PRACH signal, and a cyclic shift corresponding to the to-be-detected signal is the first cyclic shift, and when the correlation coefficient between the sequence in the to-be-detected signal and the preamble sequence corresponding to the second cyclic shift is greater than the valid threshold, the to-be-detected signal is a PRACH signal, and the cyclic shift corresponding to the to-be-detected signal is the second cyclic shift; send a random access response by using the transceiver; and receive uplink information from the terminal by using the transceiver, where when the uplink information indicates that the to-be-detected signal is from the terminal, the to-be-detected signal is the target PRACH signal.

In one embodiment, the valid threshold is obtained based on a correlation coefficient between a preamble sequence corresponding to a pre-stored third cyclic shift and the sequence in the to-be-detected signal, and the first cyclic shift, the second cyclic shift, and the third cyclic shift are corresponding to the same root.

In one embodiment, before receiving, by using the transceiver, the physical random access channel PRACH signal sent by the terminal, the processor is further configured to:

determine, based on information about a cell in which the terminal is located, a sending time period of a PRACH signal corresponding to the cell in which the terminal is located, where there is no intersection between sending time periods of respective PRACH signals corresponding to neighboring cells; and notify the terminal of the sending time period of the PRACH signal corresponding to the cell in which the terminal is located, so that the sending time period serves as a target sending time period of the target PRACH signal.

According to a fifth aspect, a random access apparatus is provided, including a unit configured to perform the first aspect or any possible implementation of the first aspect.

According to a sixth aspect, a random access apparatus is provided, including a unit configured to perform the second aspect or any possible implementation of the second aspect.

DESCRIPTION OF EMBODIMENTS

The following describes the embodiments of the present disclosure with reference to accompanying drawings.

First, a random access procedure used in a public network LTE system is briefly described.

The random access procedure of the public network LTE system includes the following four operations:

(1) UE sends a random access preamble (random access preamble) to a base station.

The UE randomly selects one random access preamble on a PRACH resource allocated by a cell, and sends the random access preamble to the base station, so as to notify the base station that the UE wants to access the cell. The base station detects, on a known PRACH resource, random access preambles and a round-trip transmission delay corresponding to each preamble.

(2) The UE receives a random access response (Random access response, RAR) sent by the base station.

The UE monitors, within a random access response window, whether an RAR indicated by a physical downlink control channel (Physical Downlink Control Channel, PDCCH) exists. The PDCCH indicating the RAR is scrambled by using a random access radio network temporary identifier (Random access radio network temporary identifier, RA-RNTI). If the RAR does not exist, or a preamble index (preamble index) included in the RAR is different from a preamble index sent by the UE, the current random access procedure fails. There is a correspondence between the random access preamble and the preamble index that are sent by the UE.

(3) The UE sends a contention resolution identifier to the base station.

Because different UE may select a same preamble, even if the RAR includes the preamble index sent by the UE, it cannot indicate that the current random access procedure of the UE is successful. Therefore, to resolve the possible contention problem, the UE reports UE-specific identification information as the contention resolution identifier to the base station on a physical uplink shared channel (Physical uplink shared channel, PUSCH) allocated in the RAR.

(4) The UE receives a contention resolution message replied by the base station.

If an identity, of UE that succeeds in contention, carried in the contention resolution message received by the UE matches the UE, random access succeeds. If the UE identity does not match the UE, random access fails.

Figure 1:
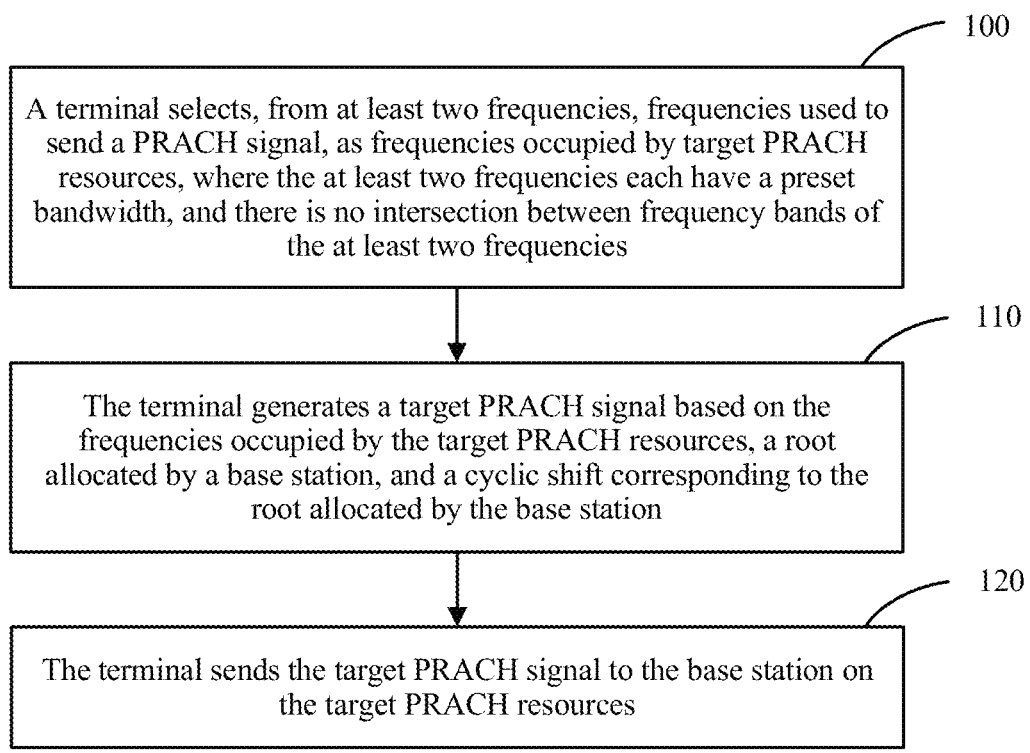
FIG. 1 is an overview flowchart 1 of a random access method according to an embodiment of the present disclosure.

As shown in FIG. 1, an embodiment of the present disclosure provides a random access method, including:

Operation 100: A terminal selects, from at least two frequencies, frequencies used to send a PRACH signal, as frequencies occupied by target PRACH resources, where the at least two frequencies each have a preset bandwidth, and there is no intersection between frequency bands of the at least two frequencies.

In one embodiment, the at least two frequencies are discontinuous or discrete.

In one embodiment, the at least two frequencies are at least two frequencies used for data receiving in an Internet of Things system.

In one embodiment, the at least two frequencies are at least two frequencies used for data receiving in a power system of the Internet of Things system.

For example, 40 discrete frequencies authorized to an electric power sector are included in 223 MHz to 235 MHz, and a bandwidth of each frequency is 25 KHz.

In one embodiment, there are at least two target PRACH resources, there are at least two frequencies used to send the PRACH signal, and the target PRACH resources are in a one-to-one correspondence with the frequencies used to send the PRACH signal.

The terminal may select, from the at least two frequencies in the following two non-restrictive manners, the frequencies used to send the PRACH signal:

The first manner is randomly selecting, from the at least two frequencies, the frequencies used to send the PRACH signal.

This manner is easy to implement, but channel state information of a selected frequency is not considered in this manner. If there is serious interference in the selected frequency, channel quality is not guaranteed, and therefore a random access success rate is affected.

The second manner is selecting, from the at least two frequencies, frequencies corresponding to downlink system information that can be correctly parsed, as the frequencies used to send the PRACH signal, where the downlink system information is from a base station.

It should be understood that the downlink system information is sent by the base station at the frequencies.

For example, the terminal may use, as candidate frequency resources, three frequencies corresponding to three pieces of downlink system information that can be correctly parsed, and then randomly select at least one of the three frequencies to send the target PRACH signal to the base station.

Because channel quality at the frequencies corresponding to the downlink system information that can be correctly parsed is guaranteed, and interference is not serious, the random access success rate can be increased.

Operation 110: The terminal generates a target PRACH signal based on the frequencies occupied by the target PRACH resources, a root allocated by a base station, and a cyclic shift corresponding to the root allocated by the base station.

Generating the target PRACH signal based on the frequencies occupied by the target PRACH resources, the root allocated by the base station, and the cyclic shift corresponding to the root allocated by the base station may be processed in the following two cases:

First, the terminal obtains reference signal received power (Reference Signal Received Power, RSRP) of a signal from the base station, and then compares the RSRP with a preset threshold.

The first case is as follows: When the RSRP is greater than the preset threshold, the target PRACH signal is generated based on the frequencies occupied by the target PRACH resources, the root allocated by the base station, and a first cyclic shift corresponding to the root allocated by the base station, where the first cyclic shift is used to indicate that the RSRP is greater than the preset threshold.

The second case is as follows: When the RSRP is less than or equal to the preset threshold, the target PRACH signal is generated based on the frequencies occupied by the target PRACH resources, the root allocated by the base station, and a second cyclic shift corresponding to the root allocated by the base station, where the second cyclic shift is used to indicate that the RSRP is less than or equal to the preset threshold.

It should be understood that when the RSRP is greater than the preset threshold, it indicates that the terminal is relatively close to a cell center, and when the RSRP is less than or equal to the preset threshold, it indicates that the terminal is relatively far from the cell center and may be located on a cell edge. In this case, to ensure that a terminal on the cell edge can successfully receive control signaling sent by the base station, when a cyclic shift corresponding to the target PRACH signal is the first cyclic shift, the base station determines that a quantity of PDCCH resources allocated to the terminal is a first quantity, and when the cyclic shift corresponding to the target PRACH signal is the second cyclic shift, the base station determines that the quantity of PDCCH resources allocated to the terminal is a second quantity. The second quantity is greater than the first quantity, and the first cyclic shift and the second cyclic shift are corresponding to a same root.

Therefore, when generating the target PRACH signal by using different cyclic shifts, the terminal may further provide location information of the terminal for the base station, for example, indicating a relationship between a current location of the terminal and the cell center. In addition, the terminal may further provide service information of the terminal for the base station. For example, different cyclic shifts are corresponding to different services. The terminal determines, based on a service type of a service that needs to be initiated according to a requirement of the terminal, a corresponding cyclic shift to generate the target PRACH signal. When detecting the target PRACH signal, the base station may learn of, based on the cyclic shift corresponding to the target PRACH signal, the service type of the service that needs to be initiated by the terminal.

Operation 120: The terminal sends the target PRACH signal to the base station on the target PRACH resources.

A bandwidth occupied by a subcarrier in the target PRACH signal is greater than 100 Hz and less than 200 Hz.

In the Internet of Things system, duration of the PRACH signal needs to meet requirements of wide coverage and deep coverage of the Internet of Things system. To adapt to the Internet of Things system, the target PRACH signal mentioned in this embodiment of the present disclosure may use the following design idea:

First, in a public network LTE system, a PRACH signal includes a cyclic prefix (Cyclic prefix, CP), a preamble sequence, and a guard time (Guard time, GT).

In this embodiment of the present disclosure, the PRACH signal still uses this signal structure, where a CP length in the PRACH signal is greater than a round-trip delay corresponding to a preset maximum cell radius and a maximum delay spread corresponding to the preset maximum cell radius, so that a CP supports a size of a cell required for coverage. A GT length is greater than the round-trip delay, to avoid leaving a signal to a next subframe (subframe), resulting in interference (interference). A preamble sequence length is equal to a reciprocal of a bandwidth of a preset subcarrier.

A TTI of the PRACH signal of the public network LTE is 1 ms or 2 ms, the duration is relatively short, and signal energy cannot meet the requirements of wide coverage and deep coverage of the Internet of Things system. For example, many devices are located at a location having a large path loss, such as a basement and a storeroom. When the duration of the signal is relatively short, devices at these locations may be unable to receive the signal successfully.

Therefore, during determining of the bandwidth of the preset subcarrier, the bandwidth of the preset subcarrier cannot be excessively large or small. If the bandwidth of the preset subcarrier is excessively large, the duration (transmission time interval, TTI) is decreased, the signal energy decreases, and a signal detection probability (detection probability) decreases. In addition, as the TTI decreases, proportions of the CP and the GT increase, resulting in an increase of overhead (overhead). In addition, if the bandwidth of the preset subcarrier is excessively large, a quantity of actual subcarriers at a single discrete frequency decreases, and a length of the preamble sequence (preamble sequence) is shortened, resulting in a decrease of a quantity of roots in an optional ZC sequence and a decrease of a quantity of cyclic shifts that can be provided by each root. Further, an excessively small bandwidth of the preset subcarrier causes a signal to be greatly affected by a frequency offset (frequency offset).

A bandwidth determined by multiplying the bandwidth of the preset subcarrier by a subcarrier quantity is less than a frequency bandwidth. The subcarrier quantity is determined based on an available bandwidth and the bandwidth of the preset subcarrier, and is a prime number. The subcarrier quantity is equal to a constituted preamble sequence length $N_{ZC}$. A preamble sequence herein is a ZC sequence, the available bandwidth is equal to a difference between a bandwidth of a single discrete frequency and a bandwidth of a preset guard band, and the preset guard band is used to prevent signal interference. One cyclic shift corresponding to each root may generate one ZC sequence.

The root allocated by the base station is a root whose frequency offset (frequency offset) has small impact on timing performance of the preamble sequence and that can provide as many cyclic shifts as possible. Therefore, the root allocated by the base station is less affected by the frequency offset, and a cyclic shift in each root is less affected by the frequency offset.

A minimum distance $N^{CS}$ between two available cyclic shifts in one root is determined by the ZC sequence length $N^{ZC}$, and a maximum round-trip delay, a maximum delay spread, and reserved duration that are corresponding to a cell radius, and a maximum quantity of available cyclic shifts in one root is $$\left\lfloor \frac{N_{ZC}}{N_{CS}} \right\rfloor.$$

The maximum round-trip delay corresponding to the cell radius is $$\tau_{rtd} = \frac{2R}{c},$$

where R represents a size of the cell radius, and C represents a light speed. For example, when R=50 km, the maximum round-trip delay is 333 µs.

The maximum delay spread $\tau_{ds}$ is used to describe a multi-path delay difference, and a maximum delay difference is about 17 µs with reference to a current LTE cell. The reserved duration is used to increase a distance between two available cyclic shifts and mitigate interference caused by the frequency offset.

A PRACH signal applicable to the power system in the Internet of Things system is described by using an example in the following.

Figure 2:
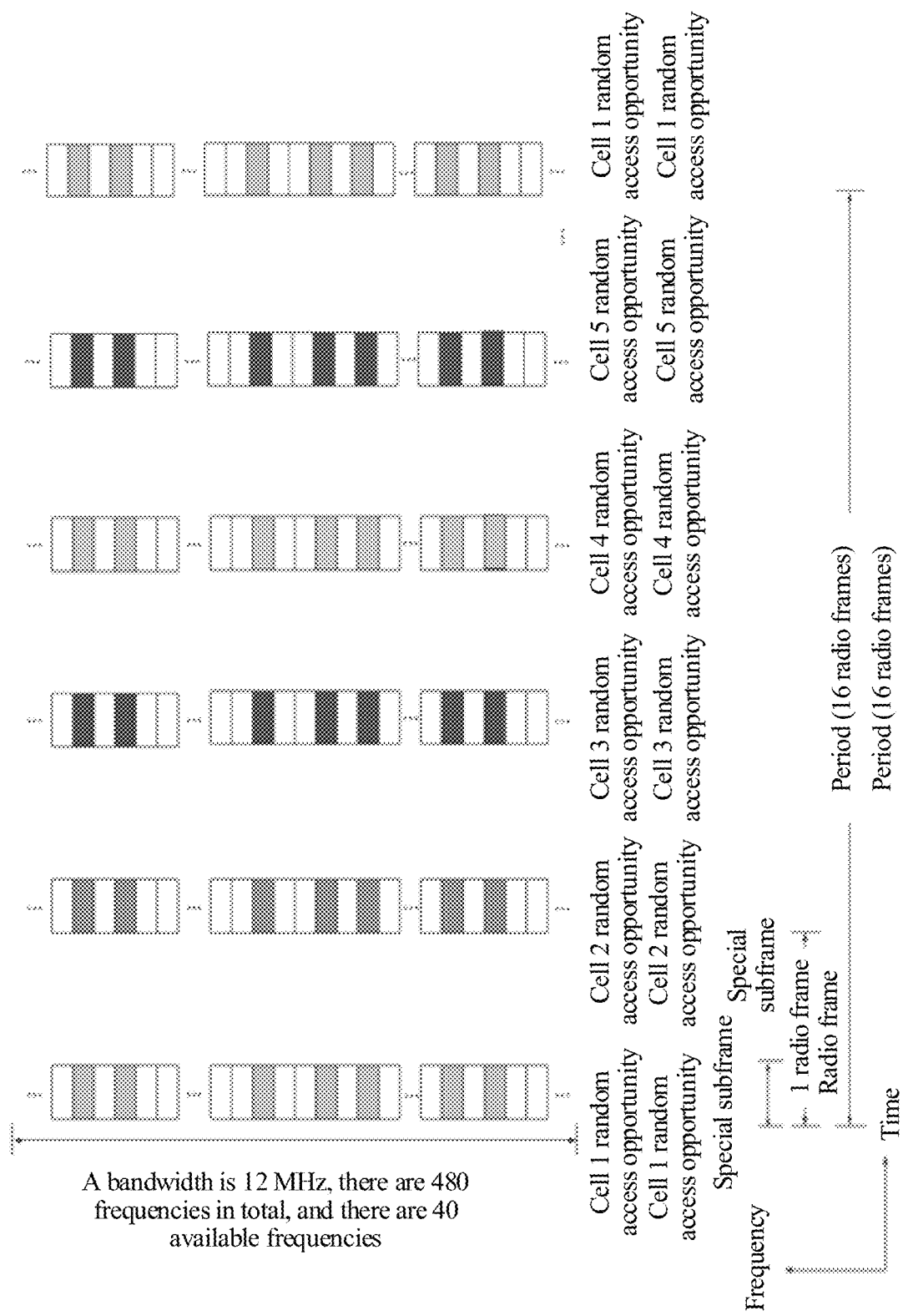
FIG. 2 is a schematic diagram of terminal random access according to an embodiment of the present disclosure.
Figure 3:
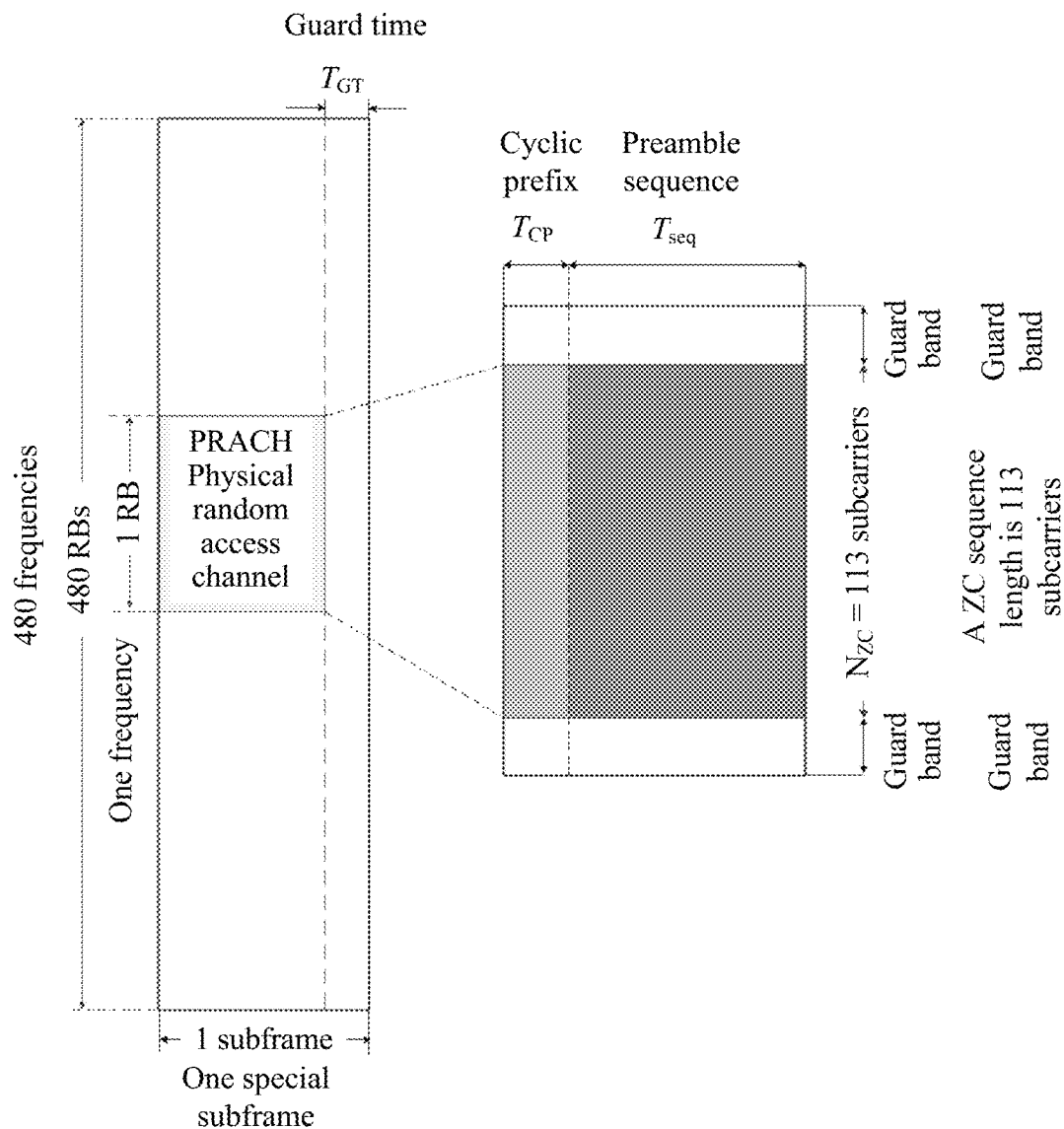
FIG. 3 is a schematic structural diagram of a PRACH signal according to an embodiment of the present disclosure.

As shown in FIG. 2, it is assumed that a random access opportunity period (random access opportunity period) in an Internet of Things system is set to 16 radio frames (radio frames). A random access opportunity is located in a special subframe (special subframe). As shown in FIG. 3, it is assumed that a frequency error (frequency error) is between ±50 Hz, and a bandwidth of a preset subcarrier is selected as 156.25 Hz. Then, a length of a TTI is 6.4 ms; in other words, 1/156.25 Hz=6.4 ms. If a bandwidth of a single discrete frequency is 25 kHz, a possible subcarrier quantity is 25 kHz/156.25 Hz=160. Some frequency band resources on two sides of a single discrete frequency resource need to be reserved as preset guard bands. It is assumed that the guard bands reserved on both sides are 20×156.25 Hz, and then a possible subcarrier quantity is reduced to 120. Because an actual subcarrier quantity needs to be a prime number, a maximum subcarrier quantity is 113. Therefore, a ZC sequence length is 113. A bandwidth determined by multiplying the bandwidth of the preset subcarrier by the subcarrier quantity is 113×156.25 Hz=17.65625 kHz.

In consideration that a maximum cell radius is 100 km, a round-trip delay (round-trip delay) corresponding to the maximum cell radius is preset to at least 666 µs, and a maximum delay spread (maximum delay spread) corresponding to the maximum cell radius is preset to 17 µs. Then, a CP is at least 700 µs. A CP length is configured to be 0.8 ms, and a GT length is configured to be 0.8 ms (the GT length is selected to ensure consistency with GT configuration in the special subframe).

Related parameters of the PRACH signal are shown in Table 1:

TABLE 1

| | |
|---|---|
| Quantity of subframes allocated to the PRACH signal | 1 |
| Bandwidth of a subcarrier (Subcarrier spacing) (Hz) | 156.25 |
| CP length (ms) | 0.8 |
| Preamble length (ms) | 6.4 |
| GP length (ms) | 0.8 |

Further, because the ZC sequence length is 113, there may be 113 cyclic shifts, namely, 0 to 112(including 0 and 112). However, because a cyclic shift used as a preamble sequence needs to have a timing (timing) function, not all cyclic shifts can be used.

It can be learned from the foregoing that, time corresponding to $N_{ZC}$=113 is 6.4 ms. In consideration of a cell radius of 50 km, a round-trip delay is 333 µs, a delay spread is 17 µs, and total time is 350 µs. An interval between available cyclic shifts is $$N_{cs} = \frac{350 \text{ µs}}{6.4 \text{ ms}} \cdot N_{ZC} \approx 6.17;$$

in other words, 350/6400*113≈6.

In addition, reserved duration is considered to be about 100 µs.

Therefore, the interval between available cyclic shifts is 8; in other words, $N_{CS}$≥8. Therefore, it is necessary to ensure that a difference between two adjacent cyclic shifts is greater than or equal to $N_{CS}$. For a ZC sequence with a length of $N_{ZC}$, a maximum quantity of available cyclic shifts is $$\left\lfloor \frac{N_{ZC}}{N_{CS}} \right\rfloor;$$

in other words, 113/8≈14.

For example, $$K @ \left\{ \kappa \mid \kappa = m \cdot N_{CS}, 0 \leq m \leq \left\lfloor \frac{N_{ZC}}{N_{CS}} \right\rfloor - 1 \right\}.$$

K represents a set of cyclic shifts, m is used to indicate indexes of cyclic shifts, and K=m·$N_{CS}$ refers to an index of each cyclic shift.

Further, in consideration of impact of a frequency offset, roots of ZC sequences and cyclic shifts corresponding to the ZC sequences are selected preferably. Selected roots are roots 7, 33, 40, 53, 60, 73, 80, and 106. A corresponding cyclic shift set is shown in Table 2. Table 2 shows roots and a list of cyclic shifts corresponding to a cell radius of 50 km.

TABLE 2

| | | Cyclic shift (Cyclic shift) | | |
|---|---|---|---|---|
| Configuration index | Root | First preset group | Second preset group | Third preset group |
| 0 | 7 | 8, 32 | 40, 72 | 0, 64 |
| 1 | 33 | 8, 16 | 48, 64 | 0, 56 |
| 2 | 40 | 8, 16 | 24, 40 | 0, 32 |
| 3 | 53 | 8, 16 | 24, 72 | 0, 64 |
| 4 | 60 | 8, 16 | 24, 72 | 0, 64 |
| 5 | 73 | 8, 16 | 24, 40 | 0, 32 |
| 6 | 80 | 8, 16 | 48, 64 | 0, 56 |
| 7 | 106 | 8, 32 | 40, 72 | 0, 64 |

Figure 4:
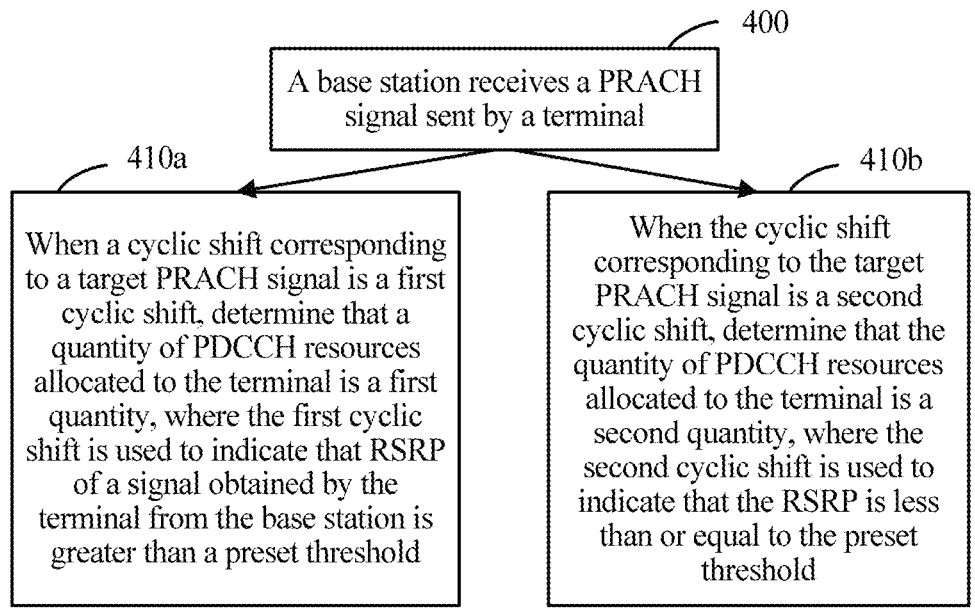
FIG. 4 is an overview flowchart 2 of a random access method according to an embodiment of the present disclosure.

As shown in FIG. 4, an embodiment of the present disclosure provides a random access method, including:

Operation 400: A base station receives a target PRACH signal sent by a terminal.

When receiving the PRACH signal sent by the terminal, the base station needs to perform the following operations:

First, the base station receives a to-be-detected signal. Because the base station does not know a signal type of a received signal, and does not know whether the received signal is sent by the terminal, the base station needs to perform determining on each received to-be-detected signal.

Then, the base station calculates a correlation coefficient between a sequence in the to-be-detected signal and a preamble sequence corresponding to a pre-stored first cyclic shift, and calculates a correlation coefficient between the sequence in the to-be-detected signal and a preamble sequence corresponding to a pre-stored second cyclic shift.

The correlation coefficient herein may be an inner product.

Further, when the correlation coefficient between the sequence in the to-be-detected signal and the preamble sequence corresponding to the first cyclic shift is greater than a valid threshold, the to-be-detected signal is a PRACH signal, and a cyclic shift corresponding to the to-be-detected signal is the first cyclic shift. When the correlation coefficient between the sequence in the to-be-detected signal and the preamble sequence corresponding to the second cyclic shift is greater than the valid threshold, the to-be-detected signal is a PRACH signal, and the cyclic shift corresponding to the to-be-detected signal is the second cyclic shift.

The base station sends a random access response and receives uplink information from the terminal. When the uplink information indicates that the to-be-detected signal is from the terminal, the to-be-detected signal is a target PRACH signal.

In this way, the base station has determined the signal type of the to-be-detected signal and an identity of a sender of the to-be-detected signal.

Further, the valid threshold herein is obtained based on a correlation coefficient between a preamble sequence corresponding to a pre-stored third cyclic shift and the sequence in the to-be-detected signal, and the first cyclic shift, the second cyclic shift, and the third cyclic shift are corresponding to a same root.

It should be understood that one PRACH resource may be corresponding to one root or may be corresponding to a plurality of roots.

Terminals in a same cell may use a same root, and sending time periods of the terminals in the same cell are the same.

It should be understood that frequency interference is different at different moments. If the valid threshold is a fixed value, in a case of large interference, the base station may be likely to detect a PRACH signal by mistake. Therefore, the valid threshold needs to change in real time with an interference situation. In consideration that interference to different cyclic shift in sequences generated by one root is approximately the same, the valid threshold is determined by using the pre-stored third cyclic shift, so as to improve accuracy of determining that the received to-be-detected signal is the PRACH signal.

Operation 410*a*: When a cyclic shift corresponding to the target PRACH signal is a first cyclic shift, determine that a quantity of PDCCH resources allocated to the terminal is a first quantity, where the first cyclic shift is used to indicate that RSRP of a signal obtained by the terminal from the base station is greater than a preset threshold.

Operation 410*b*: When the cyclic shift corresponding to the target PRACH signal is a second cyclic shift, determine that the quantity of PDCCH resources allocated to the terminal is a second quantity, where the second cyclic shift is used to indicate that the RSRP is less than or equal to the preset threshold.

The second quantity is greater than the first quantity, and the first cyclic shift and the second cyclic shift are corresponding to a same root.

As shown in Table 2, eight roots are included. Six cyclic shifts are selected from each root, and four of the six cyclic shifts are grouped into a first preset group and a second preset group and allocated to the terminal to generate a PRACH signal. As pre-stored cyclic shifts, two cyclic shifts are not allocated to the terminal and are used to determine a valid threshold. After determining that the to-be-detected signal is a PRACH signal and learning of the cyclic shift corresponding to the to-be-detected signal, the base station determines, based on a group to which the cyclic shift belongs, a quantity of PDCCH resources allocated to the terminal. For example, when the cyclic shift belongs to the first preset group, a quantity of PDCCH resources that is corresponding to the first preset group is allocated to the terminal, and a cyclic shift in the first preset group is used to indicate that RSRP is less than or equal to the preset threshold. When the cyclic shift belongs to the second preset group, a quantity of PDCCH resources that is corresponding to the second preset group is allocated to the terminal, and a cyclic shift in the second preset group is used to indicate that the RSRP is greater than the preset threshold.

In addition, before operation 400 is performed, the base station determines, based on information about a cell in which the terminal is located, a sending time period of a PRACH signal corresponding to the cell in which the terminal is located, and notifies the terminal of the sending time period of the PRACH signal corresponding to the cell in which the terminal is located, so that the sending time period serves as a target sending time period of the target PRACH signal. There is no intersection between sending time periods of respective PRACH signals corresponding to neighboring cells.

Therefore, when sending the target PRACH signal to the base station on target PRACH resources, within a target sending time period corresponding to the target PRACH resources, the terminal sends the target PRACH signal to the base station at frequencies occupied by the target PRACH resources. The target sending time period is determined by the base station and notified to the terminal, or the target sending time period may be determined by the terminal based on the information about the cell in which the terminal is located.

For example, 15 special subframes within one period are used as 15 random access time periods staggered in terms of time. In this case, a sending time period of a PRACH signal corresponding to each cell may be as follows: A cell whose cell ID modulo 15 has a remainder i uses an (i+1)th special subframe as a sending time period of a corresponding PRACH signal. The base station determines, based on a cell identity of the cell in which the terminal is located, a sending time period of a PRACH signal corresponding to the cell in which the terminal is located, and notifies the terminal in the cell of the sending time period. Alternatively, before performing a random access procedure, the terminal obtains cell ID information by using a downlink synchronization signal such as a primary synchronization signal (Primary Synchronization Signal, PSS) and a secondary synchronization signal (Secondary Synchronization Signal, SSS). Then, after the cell ID modulo 15, the terminal uses, based on a remainder, a (remainder +1)th special subframe as a sending time period of a corresponding target PRACH signal.

Figure 5:
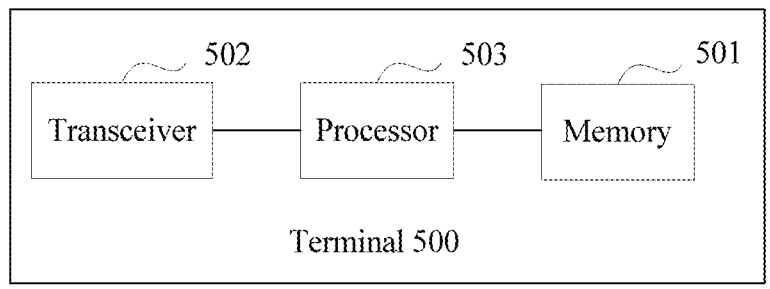
FIG. 5 is a schematic structural diagram of a terminal according to an embodiment of the present disclosure.

As shown in FIG. 5, an embodiment of the present disclosure provides a terminal 500, including a memory 501, a transceiver 502, and a processor 503.

The memory 501 is configured to store program code to be executed by the processor 503.

The processor 503 is configured to perform the following operations based on the program code stored in the memory 501:

selecting, from at least two frequencies, frequencies used to send a physical random access channel PRACH signal, as frequencies occupied by target PRACH resources, where the at least two frequencies each have a preset bandwidth, and there is no intersection between frequency bands of the at least two frequencies;

generating a target PRACH signal based on the frequencies occupied by the target PRACH resources, a root allocated by a base station, and a cyclic shift corresponding to the root allocated by the base station; and sending the target PRACH signal to the base station on the target PRACH resources by using the transceiver 502.

In a possible implementation, the at least two frequencies are at least two frequencies used for data receiving in an Internet of Things system.

In a possible implementation, the at least two frequencies are at least two frequencies used for data receiving in a power system of the Internet of Things system.

In a possible implementation, there are at least two target PRACH resources, there are at least two frequencies used to send the PRACH signal, and the target PRACH resources are in a one-to-one correspondence with the frequencies used to send the PRACH signal.

In a possible implementation, when selecting, from the at least two frequencies, the frequencies used to send the PRACH signal, the processor 503 is configured to:

randomly select, from the at least two frequencies, the frequencies used to send the PRACH signal; or select, from the at least two frequencies, frequencies corresponding to downlink system information that can be correctly parsed, as the frequencies used to send the PRACH signal, where the downlink system information is from the base station.

In one embodiment, when generating the target PRACH signal based on the frequencies occupied by the target PRACH resources, the root allocated by the base station, and the cyclic shift corresponding to the root allocated by the base station, the processor 503 is configured to:

obtain reference signal received power RSRP of a signal from the base station; and when the RSRP is greater than a preset threshold, generate the target PRACH signal based on the frequencies occupied by the target PRACH resources, the root allocated by the base station, and a first cyclic shift corresponding to the root allocated by the base station, where the first cyclic shift is used to indicate that the RSRP is greater than the preset threshold; or when the RSRP is less than or equal to the preset threshold, generating the target PRACH signal based on the frequencies occupied by the target PRACH resources, the root allocated by the base station, and a second cyclic shift corresponding to the root allocated by the base station, where the second cyclic shift is used to indicate that the RSRP is less than or equal to the preset threshold.

In one embodiment, a bandwidth occupied by a subcarrier in the target PRACH signal is greater than 100 Hz and less than 200 Hz.

In a possible implementation, when sending the target PRACH signal to the base station on the target PRACH resources by using the transceiver 502, the processor 503 is configured to:

within a target sending time period corresponding to the target PRACH resources, send, by using the transceiver 502, the target PRACH signal to the base station at the frequencies occupied by the target PRACH resources, where the target sending time period is determined based on information about a cell in which the terminal is located, or the target sending time period is determined by the base station and notified to the terminal, and there is no intersection between sending time periods of respective PRACH signals corresponding to neighboring cells.

It should be noted that the terminal herein is also referred to as user equipment (User Equipment, UE) and is a device that provides a user with voice and/or data connectivity, for example, a handheld device or an in-vehicle device having a wireless connection function. For example, a common terminal includes a mobile phone, a tablet computer, a notebook computer, a palmtop computer, a mobile Internet device (mobile internet device, MID), and a wearable device such as a smartwatch, a smart band, and a pedometer.

Figure 6:
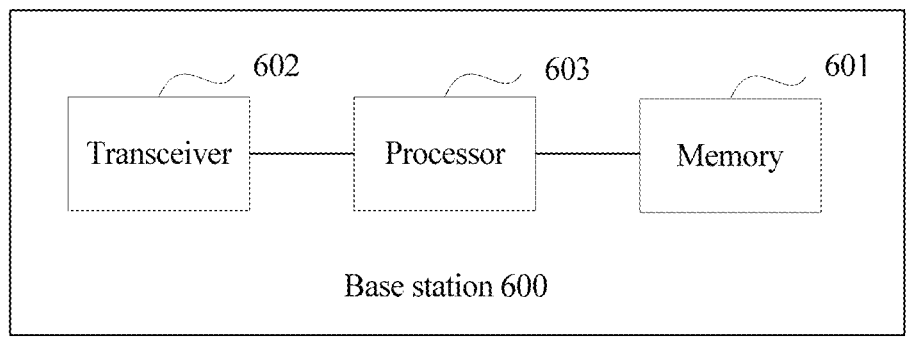
FIG. 6 is a schematic structural diagram 1 of a base station according to an embodiment of the present disclosure.

As shown in FIG. 6, an embodiment of the present disclosure provides a base station 600, including a memory 601, a transceiver 602, and a processor 603.

The memory 601 is configured to store program code to be executed by the processor 603.

The processor 603 is configured to perform the following operations based on the program code stored in the memory 601:

receiving, by using the transceiver 602, a target physical random access channel PRACH signal sent by a terminal;

when a cyclic shift corresponding to the target PRACH signal is a first cyclic shift, determining that a quantity of PDCCH resources allocated to the terminal is a first quantity, where the first cyclic shift is used to indicate that reference signal received power RSRP of a signal obtained by the terminal from the base station is greater than a preset threshold; or when the cyclic shift corresponding to the target PRACH signal is a second cyclic shift, determining that the quantity of PDCCH resources allocated to the terminal is a second quantity, where the second cyclic shift is used to indicate that the RSRP is less than or equal to the preset threshold, the second quantity is greater than the first quantity, and the first cyclic shift and the second cyclic shift are corresponding to a same root.

In one embodiment, when receiving the PRACH signal sent by the terminal, the processor 603 is configured to:

receive a to-be-detected signal by using the transceiver 602;

calculate a correlation coefficient between a sequence in the to-be-detected signal and a preamble sequence corresponding to the pre-stored first cyclic shift;

calculate a correlation coefficient between the sequence in the to-be-detected signal and a preamble sequence corresponding to the pre-stored second cyclic shift, where when the correlation coefficient between the sequence in the to-be-detected signal and the preamble sequence corresponding to the first cyclic shift is greater than a valid threshold, the to-be-detected signal is a PRACH signal, and the cyclic shift corresponding to the to-be-detected signal is the first cyclic shift; and when the correlation coefficient between the sequence in the to-be-detected signal and the preamble sequence corresponding to the second cyclic shift is greater than the valid threshold, the to-be-detected signal is a PRACH signal, and the cyclic shift corresponding to the to-be-detected signal is the second cyclic shift;

send a random access response by using the transceiver 602; and receive uplink information from the terminal by using the transceiver 602, where when the uplink information indicates that the to-be-detected signal is from the terminal, the to-be-detected signal is the target PRACH signal.

In one embodiment, the valid threshold is obtained based on a correlation coefficient between a preamble sequence corresponding to a pre-stored third cyclic shift and the sequence in the to-be-detected signal, and the first cyclic shift, the second cyclic shift, and the third cyclic shift are corresponding to the same root.

In one embodiment, before receiving, by using the transceiver 602, the physical random access channel PRACH signal sent by the terminal, the processor 603 is further configured to:

determine, based on information about a cell in which the terminal is located, a sending time period of a PRACH signal corresponding to the cell in which the terminal is located, where there is no intersection between sending time periods of respective PRACH signals corresponding to neighboring cells; and notify the terminal of the sending time period of the PRACH signal corresponding to the cell in which the terminal is located, so that the sending time period serves as a target sending time period of the target PRACH signal.

The base station herein is also referred to as a radio access network (Radio Access Network, RAN) device and is a device that connects the terminal to a wireless network, including but is not limited to an evolved node B (evolved Node B, eNB), a radio network controller (radio network controller, RNC), a node B (Node B, NB), a base station controller (Base Station Controller, BSC), a base transceiver station (Base Transceiver Station, BTS), a home eNodeB (for example, Home evolved NodeB or Home Node B, HNB), or a baseband unit (Baseband Unit, BBU). In addition, a Wi-Fi access point (Access Point, AP) or the like may be included.

Figure 7:
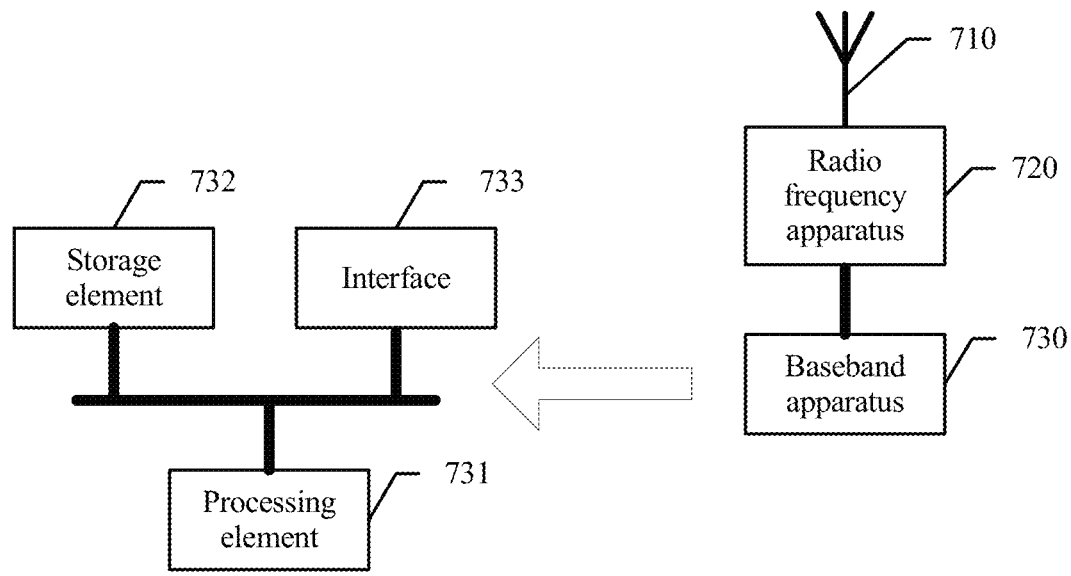
FIG. 7 is a schematic structural diagram 2 of a base station according to an embodiment of the present disclosure.

As shown in FIG. 7, an embodiment of the present disclosure provides a base station, including an antenna 710, a radio frequency apparatus 720, and a baseband apparatus 730. The antenna 710 is connected to the radio frequency apparatus 720. The baseband apparatus 730 is connected to the radio frequency apparatus 720. In an uplink direction, the radio frequency apparatus 720 receives, by using the antenna 710, information sent by a terminal, and sends, to the baseband apparatus 730 for processing, the information sent by the terminal. In a downlink direction, the baseband apparatus 730 processes terminal information, and sends the terminal information to the radio frequency apparatus 720. After processing the terminal information, the radio frequency apparatus 720 sends, by using the antenna 710, the processed terminal information to the baseband apparatus 730 that includes a processing element 731 and a storage element 732. The processing element 731 invokes a program stored in the storage element 732 to perform the method in the method embodiment shown in FIG. 3.

In addition, the baseband apparatus 730 may further include an interface 733, configured to exchange information with the radio frequency apparatus 720. The interface is, for example, a common public radio interface (common public radio interface, CPRI).

The storage element 732 may be a memory, or may be a plurality of storage elements.

Based on a same inventive concept, an embodiment of the present disclosure further provides a random access apparatus. The apparatus may be configured to perform the method embodiment corresponding to FIG. 1. Therefore, for an implementation of the random access apparatus provided in this embodiment of the present disclosure, refer to an implementation of the method, and details are not repeatedly described.

Figure 8:
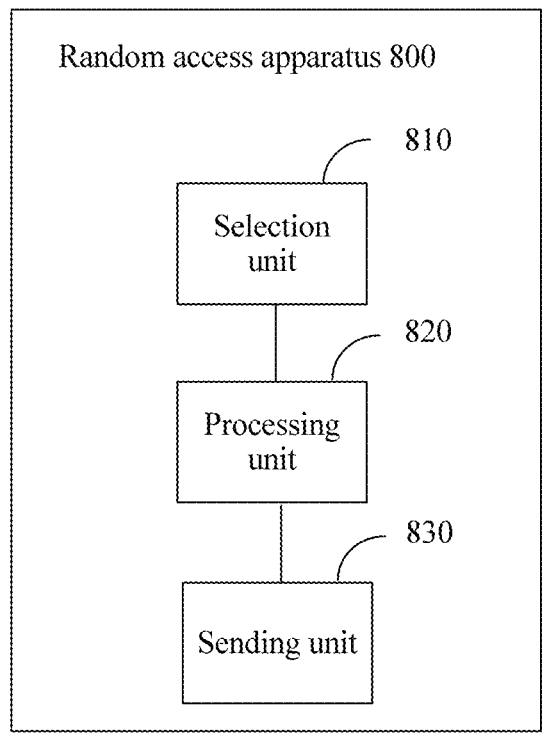
FIG. 8 is a schematic structural diagram 1 of a random access apparatus according to an embodiment of the present disclosure.

As shown in FIG. 8, an embodiment of the present disclosure provides a random access apparatus 800, including a selection unit 810, a processing unit 820, and a sending unit 830.

The selection unit 810 is configured to select, from at least two frequencies, frequencies used to send a physical random access channel PRACH signal, as frequencies occupied by target PRACH resources, where the at least two frequencies each have a preset bandwidth, and there is no intersection between frequency bands of the at least two frequencies.

The processing unit 820 is configured to generate a target PRACH signal based on the frequencies occupied by the target PRACH resources, a root allocated by a base station, and a cyclic shift corresponding to the root allocated by the base station.

The sending unit 830 is configured to send the target PRACH signal to the base station on the target PRACH resources.

In one embodiment, the at least two frequencies are at least two frequencies used for data receiving in an Internet of Things system.

In one embodiment, the at least two frequencies are at least two frequencies used for data receiving in a power system of the Internet of Things system.

In one embodiment, there are at least two target PRACH resources, there are at least two frequencies used to send the PRACH signal, and the target PRACH resources are in a one-to-one correspondence with the frequencies used to send the PRACH signal.

In one embodiment, when selecting, from the at least two frequencies, the frequencies used to send the PRACH signal, the selection unit 810 is configured to:

randomly select, from the at least two frequencies, the frequencies used to send the PRACH signal; or select, from the at least two frequencies, frequencies corresponding to downlink system information that can be correctly parsed, as the frequencies used to send the PRACH signal, where the downlink system information is from the base station.

In one embodiment, when generating the target PRACH signal based on the frequencies occupied by the target PRACH resources, the root allocated by the base station, and the cyclic shift corresponding to the root allocated by the base station, the processing unit 820 is configured to:

obtain reference signal received power RSRP of a signal from the base station; and when the RSRP is greater than a preset threshold, generate the target PRACH signal based on the frequencies occupied by the target PRACH resources, the root allocated by the base station, and a first cyclic shift corresponding to the root allocated by the base station, where the first cyclic shift is used to indicate that the RSRP is greater than the preset threshold; or when the RSRP is less than or equal to the preset threshold, generating the target PRACH signal based on the frequencies occupied by the target PRACH resources, the root allocated by the base station, and a second cyclic shift corresponding to the root allocated by the base station, where the second cyclic shift is used to indicate that the RSRP is less than or equal to the preset threshold.

In one embodiment, a bandwidth occupied by a subcarrier in the target PRACH signal is greater than 100 Hz and less than 200 Hz.

In one embodiment, when sending the target PRACH signal to the base station on the target PRACH resources, the sending unit 830 is configured to:

within a target sending time period corresponding to the target PRACH resources, send the target PRACH signal to the base station at the frequencies occupied by the target PRACH resources, where the target sending time period is determined based on information about a cell in which the terminal is located, or the target sending time period is determined by the base station and notified to the terminal, and there is no intersection between sending time periods of respective PRACH signals corresponding to neighboring cells.

Based on a same inventive concept, an embodiment of the present disclosure further provides a random access apparatus. The apparatus may be configured to perform the method embodiment corresponding to FIG. 3. Therefore, for an implementation of the random access apparatus provided in this embodiment of the present disclosure, refer to an implementation of the method, and details are not repeatedly described.

Figure 9:
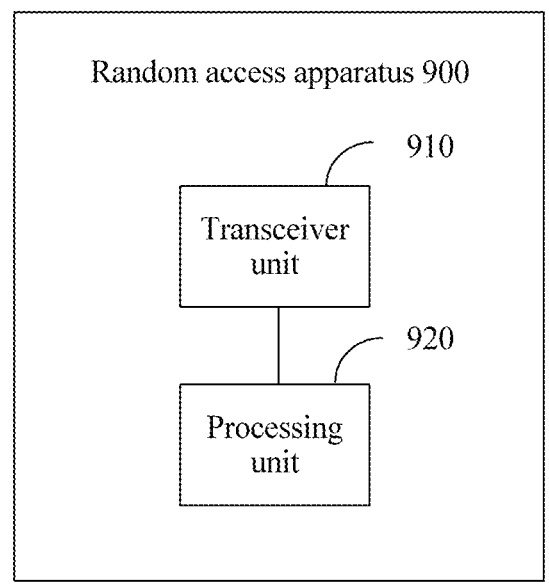
FIG. 9 is a schematic structural diagram 2 of a random access apparatus according to an embodiment of the present disclosure.

As shown in FIG. 9, a random access apparatus 900 includes a transceiver unit 910 and a processing unit 920.

The transceiver unit 910 is configured to receive a target physical random access channel PRACH signal sent by a terminal.

The processing unit 920 is configured to: when a cyclic shift corresponding to the target PRACH signal is a first cyclic shift, determine that a quantity of PDCCH resources allocated to the terminal is a first quantity, where the first cyclic shift is used to indicate that reference signal received power RSRP of a signal obtained by the terminal from the base station is greater than a preset threshold; or when the cyclic shift corresponding to the target PRACH signal is a second cyclic shift, determine that the quantity of PDCCH resources allocated to the terminal is a second quantity, where the second cyclic shift is used to indicate that the RSRP is less than or equal to the preset threshold, the second quantity is greater than the first quantity, and the first cyclic shift and the second cyclic shift are corresponding to a same root.

In one embodiment, when receiving the PRACH signal sent by the terminal, the processing unit 920 is configured to:

receive a to-be-detected signal by using the transceiver unit 910;

calculate a correlation coefficient between a sequence in the to-be-detected signal and a preamble sequence corresponding to the pre-stored first cyclic shift;

calculate a correlation coefficient between the sequence in the to-be-detected signal and a preamble sequence corresponding to the pre-stored second cyclic shift, where when the correlation coefficient between the sequence in the to-be-detected signal and the preamble sequence corresponding to the first cyclic shift is greater than a valid threshold, the to-be-detected signal is a PRACH signal, and a cyclic shift corresponding to the to-be-detected signal is the first cyclic shift, and when the correlation coefficient between the sequence in the to-be-detected signal and the preamble sequence corresponding to the second cyclic shift is greater than the valid threshold, the to-be-detected signal is a PRACH signal, and the cyclic shift corresponding to the to-be-detected signal is the second cyclic shift;

send a random access response by using the transceiver unit 910; and receive uplink information from the terminal by using the transceiver unit 910, where when the uplink information indicates that the to-be-detected signal is from the terminal, the to-be-detected signal is the target PRACH signal.

In one embodiment, the valid threshold is obtained based on a correlation coefficient between a preamble sequence corresponding to a pre-stored third cyclic shift and the sequence in the to-be-detected signal, and the first cyclic shift, the second cyclic shift, and the third cyclic shift are corresponding to the same root.

In one embodiment, before receiving the physical random access channel PRACH signal sent by the terminal, the processing unit 920 is configured to:

determine, based on information about a cell in which the terminal is located, a sending time period of a PRACH signal corresponding to the cell in which the terminal is located, where there is no intersection between sending time periods of respective PRACH signals corresponding to neighboring cells; and notify the terminal of the sending time period of the PRACH signal corresponding to the cell in which the terminal is located, so that the sending time period serves as a target sending time period of the target PRACH signal.

In conclusion, by using the methods provided in the embodiments of the present disclosure, the terminal may select the frequencies occupied by the target PRACH resources, and generate the target PRACH signal based on the root allocated by the base station and the sequence corresponding to the root allocated by the base station, to match a feature of the Internet of Things system, and enable a device in the Internet of Things system to implement random access.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations are performed on the computer or the another programmable device, thereby generating computer-implemented processing. Therefore, the instructions executed on the computer or another programmable device provide operations for implementing a specific function in one or more processes in the flowcharts and/or in one or more blocks in the block diagrams.

Although some embodiments of the present disclosure have been described, a person skilled in the art can make changes and modifications to these embodiments once they learn of the basic inventive concept. Therefore, the appended claims are intended to be construed as to cover the embodiments and all changes and modifications falling within the scope of the present disclosure.

Obviously, a person skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A random access method, comprising:
selecting, by a terminal from at least two frequencies, frequencies used to send a physical random access channel (PRACH) signal, as frequencies occupied by target PRACH resources, wherein the at least two frequencies each have a preset bandwidth, and there is no intersection between frequency bands of the at least two frequencies;
generating, by the terminal, a target PRACH signal based on the frequencies occupied by the target PRACH resources, a root allocated by a base station, and a cyclic shift corresponding to the root allocated by the base station including obtaining reference signal received power (RSRP) of a signal from the base station, and, when the RSRP is greater or less than or equal to a preset threshold, generating the target PRACH signal based on the frequencies occupied by the target PRACH resources, the cyclic shift corresponding to the root allocated by the base station, the cyclic shift used to indicate that the RSRP is greater or less than or equal to the preset threshold; and
sending, by the terminal, the target PRACH signal to the base station on the target PRACH resources.

2. The method according to claim 1, wherein the at least two frequencies are used for data receiving in an Internet of Things system.

3. The method according to claim 1, wherein the at least two frequencies are used for data receiving in a power system in an Internet of Things system.

4. The method according to claim 1, wherein there are at least two target PRACH resources, there are at least two frequencies used to send the PRACH signal, and the target PRACH resources are in a one-to-one correspondence with the frequencies used to send the PRACH signal.

5. The method according to claim 1, wherein selecting, from at least two frequencies, frequencies used to send a PRACH signal comprises:
randomly selecting, from the at least two frequencies, the frequencies used to send the PRACH signal; or
selecting, from the at least two frequencies, frequencies corresponding to downlink system information that can be correctly parsed, as the frequencies used to send the PRACH signal, wherein the downlink system information is from the base station.

6. The method according to claim 1, futher comprising:
when the RSRP is greater than the preset threshold, generating the target PRACH signal based on the frequencies occupied by the target PRACH resources, the root allocated by the base station, and a first cyclic shift corresponding to the root allocated by the base station, wherein the first cyclic shift is used to indicate that the RSRP is greater than the preset threshold; or when the RSRP is less than or equal to the preset threshold, generating the target PRACH signal based on the frequencies occupied by the target PRACH resources, the root allocated by the base station, and a second cyclic shift corresponding to the root allocated by the base station, wherein the second cyclic shift is used to indicate that the RSRP is less than or equal to the preset threshold.

7. The method according to claim 1, wherein a bandwidth occupied by a subcarrier in the target PRACH signal is greater than 100 Hz and less than 200 Hz.

8. The method according to claim 1, wherein sending the target PRACH signal to the base station on the target PRACH resources comprises:
within a target sending time period corresponding to the target PRACH resources, sending the target PRACH signal to the base station at the frequencies occupied by the target PRACH resources, wherein the target sending time period is determined by the terminal based on information about a cell in which the terminal is located, or the target sending time period is determined by the base station and notified to the terminal, and there is no intersection between sending time periods of respective PRACH signals corresponding to neighboring cells.

9. A random access method, comprising:
receiving, by a base station, a target physical random access channel (PRACH) signal sent by a terminal;
when a cyclic shift corresponding to the target PRACH signal is a first cyclic shift, determining that a quantity of PDCCH resources allocated to the terminal is a first quantity, wherein the first cyclic shift is used to indicate that a reference signal received power (RSRP) of a signal obtained by the terminal from the base station is greater than a preset threshold; or when the cyclic shift corresponding to the target PRACH signal is a second cyclic shift, determining that the quantity of PDCCH resources allocated to the terminal is a second quantity, wherein the second cyclic shift is used to indicate that the RSRP is less than or equal to the preset threshold, the second quantity is greater than the first quantity, and the first cyclic shift and the second cyclic shift are corresponding to a same root.

10. The method according to claim 9, wherein receiving the PRACH signal sent by a terminal comprises:
receiving a to-be-detected signal;
calculating a correlation coefficient between a sequence in the to-be-detected signal and a preamble sequence corresponding to a pre-stored first cyclic shift;
calculating a correlation coefficient between the sequence in the to-be-detected signal and a preamble sequence corresponding to a pre-stored second cyclic shift, wherein
when the correlation coefficient between the sequence in the to-be-detected signal and the preamble sequence corresponding to the first cyclic shift is greater than a valid threshold, the to-be-detected signal is a PRACH signal, and a cyclic shift corresponding to the to-be-detected signal is the first cyclic shift, and
when the correlation coefficient between the sequence in the to-be-detected signal and the preamble sequence corresponding to the second cyclic shift is greater than the valid threshold, the to-be-detected signal is a PRACH signal, and the cyclic shift corresponding to the to-be-detected signal is the second cyclic shift;
sending a random access response; and
receiving uplink information from the terminal, wherein when the uplink information indicates that the to-be-detected signal is from the terminal, the to-be-detected signal is the target PRACH signal.

11. The method according to claim 10, wherein the valid threshold is obtained based on a correlation coefficient between a preamble sequence corresponding to a pre-stored third cyclic shift and the sequence in the to-be-detected signal, and the first cyclic shift, the second cyclic shift, and the third cyclic shift are corresponding to the same root.

12. The method according to claim 9, further comprising:
determining, based on information about a cell in which the terminal is located, a sending time period of a PRACH signal corresponding to the cell in which the terminal is located, wherein there is no intersection between sending time periods of respective PRACH signals corresponding to neighboring cells; and
notifying the terminal of the sending time period of the PRACH signal corresponding to the cell in which the terminal is located, so that the sending time period serves as a target sending time period of the target PRACH signal.

13. A terminal, comprising a
processor, a transceiver and a non-transitory computer-readable medium having instructions stored therein, which when executed by the processor, cause the processor to perform operations comprising:
selecting, from at least two frequencies, frequencies used to send a physical random access channel PRACH signal, as frequencies occupied by target PRACH resources, wherein the at least two frequencies each have a preset bandwidth, and there is no intersection between frequency bands of the at least two frequencies;
generating a target PRACH signal based on the frequencies occupied by the target PRACH resources, a root allocated by a base station, and a cyclic shift corresponding to the root allocated by the base station including obtaining reference signal received power (RSRP) of a signal from the base station, and, when the RSRP is greater or less than or equal to a preset threshold, generating the target PRACH signal based on the frequencies occupied by the target PRACH resources, the cyclic shift corresponding to the root allocated by the base station, the cyclic shift used to indicate that the RSRP is greater or less than or equal to the preset threshold; and
sending the target PRACH signal to the base station on the target PRACH resources by using the transceiver.

14. The terminal according to claim 13, wherein the at least two frequencies are used for data receiving in an Internet of Things system.

15. The terminal according to claim 13, wherein the at least two frequencies are used for data receiving in a power system in an Internet of Things system.

16. The terminal according to claim 13, wherein there are at least two target PRACH resources, there are at least two frequencies used to send the PRACH signal, and the target PRACH resources are in a one-to-one correspondence with the frequencies used to send the PRACH signal.

17. The terminal according to claim 13, wherein when selecting, from the at least two frequencies, the frequencies used to send the PRACH signal, the processor is configured to:
randomly select, from the at least two frequencies, the frequencies used to send the PRACH signal; or
select, from the at least two frequencies, frequencies corresponding to downlink system information that can be correctly parsed, as the frequencies used to send the PRACH signal, wherein the downlink system information is from the base station.

18. The terminal according to claim 13, wherein the processor is further configured to: when the RSRP is greater than the preset threshold, generate the target PRACH signal based on the frequencies occupied by the target PRACH resources, the root allocated by the base station, and a first cyclic shift corresponding to the root allocated by the base station, wherein the first cyclic shift is used to indicate that the RSRP is greater than the preset threshold; or when the RSRP is less than or equal to the preset threshold, generate the target PRACH signal based on the frequencies occupied by the target PRACH resources, the root allocated by the base station, and a second cyclic shift corresponding to the root allocated by the base station, wherein the second cyclic shift is used to indicate that the RSRP is less than or equal to the preset threshold.

19. The terminal according to claim 13, wherein a bandwidth occupied by a subcarrier in the target PRACH signal is greater than 100 Hz and less than 200 Hz.

20. The terminal according to claim 13, wherein when sending the target PRACH signal to the base station on the target PRACH resources by using the transceiver, the processor is configured to:
within a target sending time period corresponding to the target PRACH resources, send, by using the transceiver, the target PRACH signal to the base station at the frequencies occupied by the target PRACH resources, wherein the target sending time period is determined based on information about a cell in which the terminal is located, or the target sending time period is determined by the base station and notified to the terminal, and there is no intersection between sending time periods of respective PRACH signals corresponding to neighboring cells.

21. A base station, comprising a processor, a transceiver and a non-transitory computer-readable medium having instructions stored therein, which when executed by the processor, cause the processor to perform operations comprising:
receiving, by using the transceiver, a target physical random access channel PRACH signal sent by a terminal;
when a cyclic shift corresponding to the target PRACH signal is a first cyclic shift, determining that a quantity of PDCCH resources allocated to the terminal is a first quantity, wherein the first cyclic shift is used to indicate that reference signal received power RSRP of a signal obtained by the terminal from the base station is greater than a preset threshold; or when the cyclic shift corresponding to the target PRACH signal is a second cyclic shift, determining that the quantity of PDCCH resources allocated to the terminal is a second quantity, wherein the second cyclic shift is used to indicate that the RSRP is less than or equal to the preset threshold, the second quantity is greater than the first quantity, and the first cyclic shift and the second cyclic shift are corresponding to a same root.

22. The base station according to claim 21, wherein when receiving the PRACH signal sent by the terminal, the processor is configured to:
receive a to-be-detected signal by using the transceiver;
calculate a correlation coefficient between a sequence in the to-be-detected signal and a preamble sequence corresponding to a pre-stored first cyclic shift;
calculate a correlation coefficient between the sequence in the to-be-detected signal and a preamble sequence corresponding to a pre-stored second cyclic shift, wherein
when the correlation coefficient between the sequence in the to-be-detected signal and the preamble sequence corresponding to the first cyclic shift is greater than a valid threshold, the to-be-detected signal is a PRACH signal, and a cyclic shift corresponding to the to-be-detected signal is the first cyclic shift, and when the correlation coefficient between the sequence in the to-be-detected signal and the preamble sequence corresponding to the second cyclic shift is greater than the valid threshold, the to-be-detected signal is a PRACH signal, and the cyclic shift corresponding to the to-be-detected signal is the second cyclic shift;

send a random access response by using the transceiver; and receive uplink information from the terminal by using the transceiver, wherein when the uplink information indicates that the to-be-detected signal is from the terminal, the to-be-detected signal is the target PRACH signal.

23. The base station according to claim 22, wherein the valid threshold is obtained based on a correlation coefficient between a preamble sequence corresponding to a pre-stored third cyclic shift and the sequence in the to-be-detected signal, and the first cyclic shift, the second cyclic shift, and the third cyclic shift are corresponding to the same root.

24. The base station according to claim 21, wherein the processor is further configured to:

determine, based on information about a cell in which the terminal is located, a sending time period of a PRACH signal corresponding to the cell in which the terminal is located, wherein there is no intersection between sending time periods of respective PRACH signals corresponding to neighboring cells; and notify the terminal of the sending time period of the PRACH signal corresponding to the cell in which the terminal is located, so that the sending time period serves as a target sending time period of the target PRACH signal.

* * * * *